US009720392B2

(12) United States Patent
Maier et al.

(10) Patent No.: US 9,720,392 B2
(45) Date of Patent: Aug. 1, 2017

(54) METHOD FOR COUPLING A REMOTE CONTROL AND AN ELECTRONIC DEVICE

(71) Applicant: fm marketing gmbh, Neumarkt am Wallersee (AT)

(72) Inventors: Ferdinand Maier, Neumarkt am Wallersee (AT); Thomas Mirlacher, Salzburg (AT)

(73) Assignee: fm marketing gmbh, Neumarkt am Wallersee (AT)

( * ) Notice: Subject to any disclaimer, the term of this patent is extended or adjusted under 35 U.S.C. 154(b) by 0 days.

(21) Appl. No.: 15/051,079

(22) Filed: Feb. 23, 2016

(65) Prior Publication Data

US 2016/0357164 A1    Dec. 8, 2016

(30) Foreign Application Priority Data

Jun. 2, 2015   (DE) .................. 10 2015 108 746

(51) Int. Cl.
| | |
|---|---|
| *G05B 15/02* | (2006.01) |
| *H04B 1/00* | (2006.01) |
| *G08C 17/02* | (2006.01) |
| *G08C 23/04* | (2006.01) |
| *G08C 17/00* | (2006.01) |

(52) U.S. Cl.
CPC ............. *G05B 15/02* (2013.01); *G08C 17/00* (2013.01); *G08C 17/02* (2013.01); *G08C 23/04* (2013.01); *H04B 1/0064* (2013.01); *G08C 2201/20* (2013.01); *G08C 2201/92* (2013.01)

(58) Field of Classification Search
CPC .... G05B 15/02; G08C 17/00; G08C 2201/92; G08C 2201/20; G08C 17/02; H04B 1/0064
See application file for complete search history.

(56) References Cited

U.S. PATENT DOCUMENTS

| | | | |
|---|---|---|---|
| 8,542,768 B2 * | 9/2013 | Kim ...................... | H03F 1/3247 375/297 |
| 9,258,508 B2 * | 2/2016 | Hardin ................. | H04N 21/654 |
| 2008/0062337 A1 * | 3/2008 | Maier .................... | G08C 17/00 348/734 |
| 2009/0289829 A1 * | 11/2009 | Maier .................... | G08C 23/04 341/176 |
| 2010/0060506 A1 * | 3/2010 | Maier .................... | G08C 17/02 341/176 |
| 2010/0109930 A1 * | 5/2010 | Maier .................... | G06F 21/31 341/176 |
| 2012/0057508 A1 * | 3/2012 | Moshfeghi ............... | H04B 1/28 370/277 |

(Continued)

FOREIGN PATENT DOCUMENTS

| | | |
|---|---|---|
| EP | 1981012 A2 | 10/2008 |
| EP | 2597865 A1 | 5/2013 |

*Primary Examiner* — Ramesh Patel
(74) *Attorney, Agent, or Firm* — Senniger Powers LLP

(57) ABSTRACT

A method to dispatch a request for coupling an electronic device and remote control with an input interface to input a control instruction for controlling the electronic device on a radio channel, wherein the remote control is adapted to control via the radio channel or an infrared channel the electronic device, the method comprising receiving the control instruction from the input interface, and transmitting the control instruction together with the request for coupling via the infrared channel.

20 Claims, 6 Drawing Sheets

(56) References Cited

U.S. PATENT DOCUMENTS

| | | | | |
|---|---|---|---|---|
| 2012/0206355 | A1* | 8/2012 | Maier | G08C 23/04 345/160 |
| 2013/0063339 | A1* | 3/2013 | Maier | G06F 3/0346 345/156 |
| 2014/0079153 | A1* | 3/2014 | Kim | H03F 1/3247 375/297 |
| 2014/0266637 | A1* | 9/2014 | Alsina | G06Q 30/00 340/12.26 |
| 2014/0267934 | A1* | 9/2014 | Hardin | H04N 21/654 348/734 |
| 2016/0105360 | A1* | 4/2016 | Erickson | H04L 67/141 370/392 |

\* cited by examiner

US 9,720,392 B2

METHOD FOR COUPLING A REMOTE CONTROL AND AN ELECTRONIC DEVICE

REFERENCE TO RELATED APPLICATIONS

This application claims priority to German application no. 10 2015 108 746.4 filed Jun. 2, 2015, the entire disclosure of which is hereby incorporated by reference.

FIELD OF THE INVENTION

The present invention relates to a method for coupling a remote control with an electronic device, a control apparatus to operate the method, a remote control with the control apparatus and computer program product.

BACKGROUND OF THE INVENTION

From the EP 1 981 012 A1 and the EP 2 597 865 A1 there are known remote controls with an infrared sender and a radio transceiver to control an electronic device by means of control instructions. However, prior dispatching control instructions by radio to the electronic device, the remote control will be coupled with the electronic device which is also known under the term pairing. This stands for a unique connection between two radio participants, with which the remote control will subscribe at the electronic control device. The electronic device registers the remote control and allows the reception of control instructions via the radio channel from the remote control. The coupling will thereby be started with a defined control instruction that will for example be triggered via a certain button or button combination on the remote control.

US Patent Application Publication No. 2014/0267934 discloses a method to dispatch a request for coupling an electronic device and a remote control with an input interface to input a control instruction for controlling the electronic device on a radio channel, wherein the remote control is adapted to control the electronic device via the radio channel or an infrared channel, the method comprising receiving the control instruction together with the request for coupling from the input interface of the remote control and transmitting the control instruction together with the request for coupling via the infrared channel.

SUMMARY OF THE INVENTION

Briefly, therefore, in one aspect the invention is directed to a method to dispatch a request for coupling an electronic device and a remote control with an input interface to input a control instruction for controlling the electronic device on a radio channel, wherein the remote control is adapted to control the electronic device via the radio channel or an infrared channel, the method comprising receiving the control instruction from the input interface; appending the request for coupling to the received control instruction; and transmitting the control instruction together with the appended request for coupling via the infrared channel.

The invention is also directed to a remote control comprising: an input interface to input a control instruction; a radio transceiver via which the input control instruction is dispatchable to an electronic device via a radio channel; an infrared sender via which the input control instruction is transmittable to the electronic device on an infrared channel; and a control apparatus according to claim 8 to transmit the request to couple the electronic device and the remote control via the infrared channel.

Other objects and features are in part apparent and in part pointed out hereinafter.

DETAILED DESCRIPTION OF PREFERRED EMBODIMENTS

Figure 1:
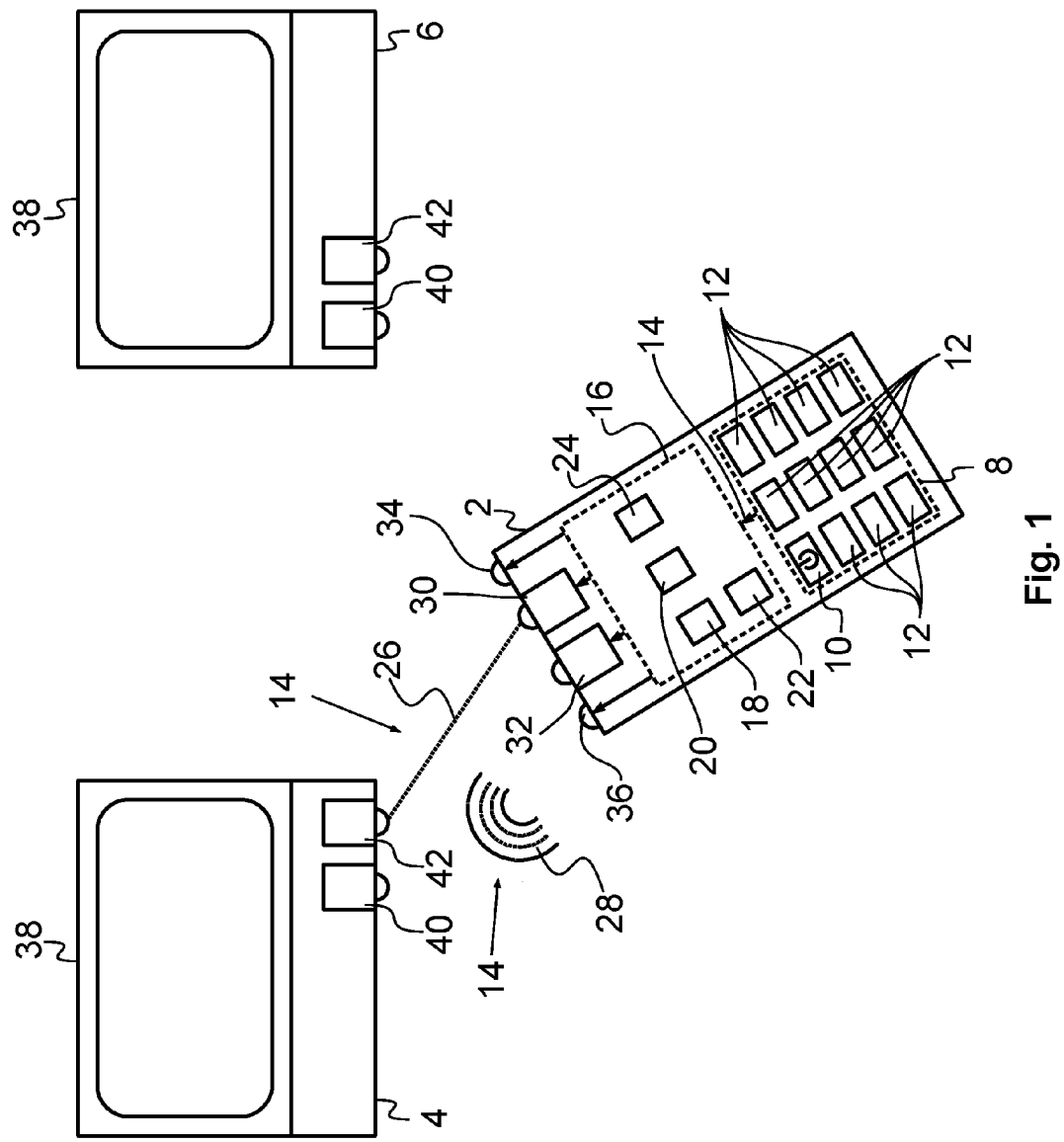
FIG. 1 a schematic diagram of a system including two electronic devices and a remote control.

According to an aspect to the invention, a method to transmit or dispatch a request for coupling an electronic device and a remote control with an input interface to input a control instruction for controlling the electronic device on a radio channel, wherein the remote control is adapted to control the electronic device via the radio channel or an infrared channel, comprises the steps receiving or transmitting the control instruction from the input interface, appending the request for coupling to the received control instruction, and transmitting the control instruction together with the appended request for coupling via the infrared channel.

The provided method is based on the thought that the step of coupling must basically be learned by the user at first. That is before using the device, the user must look up the necessary instruction to be entered up in the manual and search it then on the remote control. Dependent on the scope of operation and the volume of the manual of the remote control this can be variably time consuming.

The provided method draws on this proposal by handling the request for coupling not as instruction, but to dispatch it together with an arbitrary other control instruction to control the electronic device over the infrared channel. To dispatch a request for coupling with an arbitrary control instruction, it is appended to a user input from the user interface after the respective control instruction has been received. The provided method has therewith the advantage that if the user controls the electronic device via the infrared channel, the remote control transmits with an arbitrary control instruction for the user invisibly a coupling request to the electronic device to be controlled. Therewith, the coupling can be hidden to the user.

In a development of the provided method, the control instruction will be dispatched together with the request for coupling via the infrared channel, if the remote control is not connected with the electronic device via the radio channel, wherein the control instruction will be otherwise dispatched alone via the radio channel. That is, as soon as the coupling is finished, the transmission of the control instruction will be exclusively dispatched on the radio channel. The user does not recognize the complete process of coupling, the coupling is therewith transparent to him. Under the term transparent should thus be understood hereinafter, that the process of coupling will be triggered and executed in the background from the view of the user, such that he does not recognize the process of coupling in any way. In this way, the advantages of an infrared transmission of control instructions in respect to a simple usages of the device to be controlled and the advantages of the radio dispatch in respect to low energy consumption and the possibility to control a device even if the device to be controlled is out of optical range, can be combined.

To nevertheless provide the user an information about the coupling state, for example for maintenance purposes, an information can be output on the remote control dependent on whether the control instruction will be transmitted via the infrared channel or the radio channel. By this means it is directly visibly for the user, whether the remote control is coupled on the radio channel with the electronic device or not, because in a not coupled state, the remote control will transmit the control instructions for example when pressing a button on the input interface via infrared and in the coupled state via the radio channel.

In another development of the provided method, the request for coupling can be dependent from the control instruction. By this means, the coupling can be executed dependent from different scenarios.

In this connection, the request for coupling that is dependent from the control instruction can be a wake up instruction for the electronic device, if the control instruction is a power on instruction for electronic device. That is, if the electronic device to be controlled is in a sleeping state and will be woken up with a power on instruction, then the coupling request will be embodied differently from the case when the electronic device to be controlled will be coupled with the remote control completely new. Also this technical matter keeps hidden to the user in fact, because he controls the electronic device to be controlled simply per infrared as long as no radio channel is established.

In all cases the request for coupling that is independent from the control instruction can include an identification information, which characterizes the remote control on the radio channel uniquely. With this identification information, the remote control characterizes itself on the radio channel uniquely, such that after the transmission of the identification information, there is no further infrared contact between both communication partners necessary to finalize the coupling.

The identification information can thereby be an arbitrary information which identifies the remote control as unique as possible. A possibility would hereby be to embody it as time information, which indicates when the electronic device should power on its radio transceiver, to receive from the remote control on this radio channel further information for finishing the coupling. Alternatively or additionally, the identification information can also be a logical information, with which the remote control identifies itself uniquely on the radio channel.

According to a further aspect of the invention, a control apparatus is adapted to operate or execute one of the provided methods.

In a development of the provided control apparatus, the provided control apparatus includes a memory and a processor. Therein, the provided method is stored in the memory as a computer program and the processor is provided to operate or execute the method, when the computer program is loaded from the memory into the processor.

According to a further aspect to the invention, a computer program comprises program code to perform all steps of the provided method, when the computer program is operated or executed on an electronic apparatus or one of the provided devices.

According a further aspect of the invention, a computer program product includes a program code, that is stored on a computer readable data medium and that operates or executes, if it this operated or executed on a data processing equipment, the provided method.

According to a further aspect of the invention, the remote control comprises an input interface to input control instruction, a radio transceiver through which the input control instruction can be transmitted to an electronic device via a radio channel, an infrared sender through which the input control instruction can be transmitted to the electronic device via an infrared channel, and one of the provided control apparatuses to transmit a request for coupling the electronic device and the remote control, on the infrared channel.

The above described characteristics, features and advantages of this invention as well as the way how these will be reached, will be described in a more comprehensible way in conjunction with the following description of the embodiments which will be outlined in conjunction with the drawings in detail.

In the figures, equal technical elements will be referenced with equal reference signs and described only once. The figures are merely schematic and do especially not show the real geometric situation.

Reference is made to FIG. 1, which shows a remote control 2 to control a first electronic device 4 or a second electronic device 6.

The remote control 2 comprises an input interface 8 that is embodied as keyboard with several keys 10, 12 via which different functions should be triggered at the electronic devices 4, 6 to be controlled. One of these keys 10, 12 is a stand-by key 10. Its function to be triggered should transfer the electronic device 4, 6 to be controlled into a sleeping mode and/or should wake up the electronic device 4, 6 to be controlled from the sleeping mode. Via the other keys 12, other functions can be triggered on the electronic devices 4, 6, which understanding is not necessary for the present embodiment.

Each function to be triggered will be provided as a control instruction 14 to a control apparatus 16, also named signal processing unit. The control apparatus 16 comprises a memory 18, in which one or more computer programs are stored, as well as one or more communicating processors 20 which fetch the one or more computer programs from the memory 18 and operate or execute it. The control apparatus 16 can further have a communication interface 22, to update and/or install the computer programs in the memory 18. Finally, the control apparatus comprises at least one modulation circuit 24, for modulating the data that correspond to the control instruction 14 onto a suitable carrying signal 26, 28 and dispatching or transmitting it to the device 4, 6 to be controlled. The construction of such modulation circuits 24 is well known and should not be explained in further detailed hereinafter.

In the present embodiment, an infrared signal, called IR-signal 26 hereinafter, and a radio signal 28 are provided as carrying signals 26, 28. Therein, a so called blue tooth-low-energy-signal can be specifically used as radio signal, which can be transmitted, compared to the IR-signal 26, with a significant lower energy consumption and which can be dispatched and transmitted to the device 4, 6 to be controlled also in case, there are objects between the device 4, 6 to be controlled and the remote control 2, such as furniture's. However, any other kind of radio signal 28 can also be used. Also, the IR-signal 26 and the radio signal 28 needs not to be generated in a common modulation circuit 24. For each signal form, an own modulation circuit can be provided.

The IR-signal 26 will be sent out by an infrared sender that is called IR-sender 30 and that is driven by the modulation circuit 24. To realize the present embodiment, it is contrary to the publications EP 1 981 012 A2 and EP 2 597865 A1 not necessary that the IR-sender 30 is also able to receive the IR-signals 26. It is nevertheless also possible to embody the IR-connection analogously to the before mentioned publications in a bi-directional way.

The radio signal 28 will be transmitted by a radio transceiver 32 that is also driven by the modulation circuit 24. The radio transceiver 32 should be embodied in a bi-directional way. Is however a bi-directional communication via the IR-signal 26 possible, than the invention can basically be realized with a uni-directional radio connection.

Furthermore, the remote control 2 can include an IR-illuminant 34 and a radio signal-illuminant 36 to respectively indicate, whether the control instruction 14 will be transmitted modulated onto the IR-signal 26 and/or dispatched modulated onto the radio signal 28.

The both electronic devices 4, 6 to be controlled can respectively be embodied as so called set-top-boxes that are respectively connected to a screen 38. A set-top-box is an electronic device in the fields of consumer electronics, which provides multimedia contents to the respective screen 38. In this case, task of the remote control 2 can be controlling with the control instruction 14 the playback of the electronic device 4, 6 to exemplary change between TV-programs.

For this purpose, the respective electronic devices 4, 6 should be able to receive the IR-signal 26 and the radio signal 28. For this purpose each electronic device 4,6 has respectively an infrared receiver, called IR-receiver 42 hereinafter and a radio transceiver 40. If a control instruction 14 in the IR-signal 26 or the radio signal 28 is received, than the control instruction can be filtered from the carrying signal 26, 28 in a known manner and processed, which should be not further explain for the sake of shortness.

However, before the control instruction 14 in the radio signal 28 can be directly transmitted to the electronic devices 4 or 6, the remote control 2 must be coupled with the respective electronic device 4 or 6. In a state, in which one of the electronic devices 4, 6 is coupled, the remote control 2 has all necessary information to generate a radio signal 28 and to transmit therein data like the control instruction 14 to the respective electronic device 4 or 6 in a dedicated manner.

A method for coupling will be completely described hereinafter at first based on FIG. 2, before different scenarios for the flow of the method will be explained based on FIGS. 3 to 6. This method will in the present embodiment be executed by the processor 20 of the control apparatus 16.

After the start in step 44, the processor 20 receives in a receiving step 46 a control instruction 14 via one of the keys 10, 12. Subsequently, the processor 20 decides whether the control instruction 14 should be transmitted via a IR-signal 26 or a radio signal 28 to one of the electronic devices 4, 6. For this purpose, the processor 20 decides at first in a coupled deciding step 48, whether the remote control 2 is already coupled with one of the electronic devices 4, 6. The coupled deciding step 48 can be finished with a yes-decision 50 or with a no-decision 52 by the processor 20.

Figure 2:
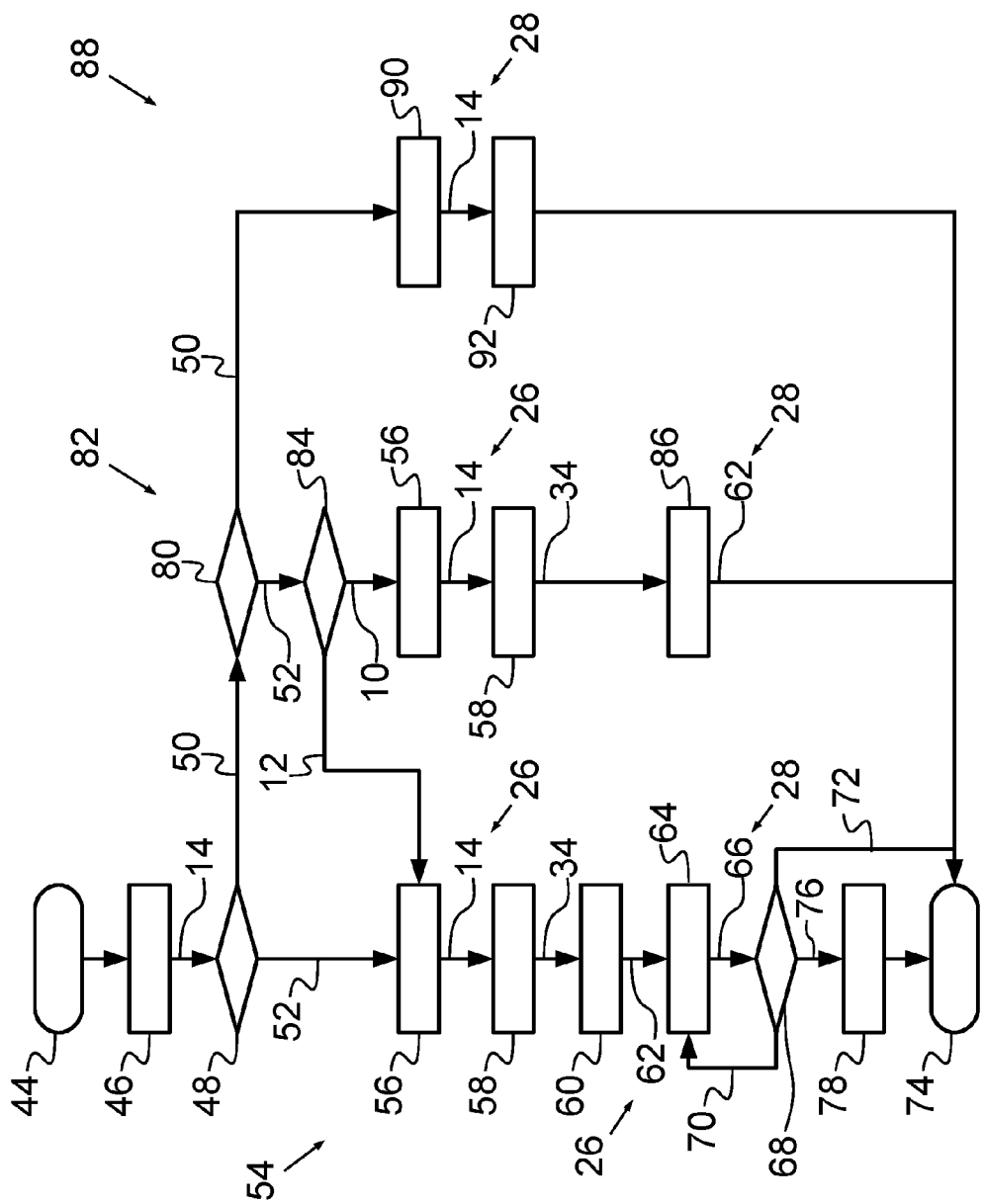
FIG. 2 a flowchart of a method that can be executed in a remote control according to FIG. 1.

In case of a no-decision 52, that is the remote control 2 is not coupled with one of the electronic devices 4, 6, the processor 20 executes the method according to a coupled flow 54 that is shown in FIG. 2. The coupled flow 54 comprises an infrared transmission step 56, in which the processor 20 drives the modulation circuit 24, to modulate the control instruction 14 onto the IR-signal 26 and to transmit it to one of the electronic devices 4, 6. In a known manner, the electronic device 4, 6, on which the remote control 2 is directed, receives the IR-signal 26 and can then process the control instruction 14 respectively.

Subsequently, the processor 20 can optionally drive the IR-illuminant 34 in an IR-display step 58 to indicate the user that for transmitting the control instruction 14, the IR-signal 26 had been used and that the user must direct the remote control 2 on the respective another electronic device, if applicable.

Finally, the processor 20 generates in an IR-request step 60 a coupling request 62 and drives the modulation circuit 24 in that the coupling request 62 in the IR-signal 26 will be transmitted together with the control instruction 4 to the respective electronic device 4, 6. In this way the coupling of the remote control 2 with the electronic device 4, 6, on which the user has directed the remote control 2 will be triggered. To trigger the coupling step, the processor 20 requires from the user no specific inputs. Pressing an arbitrary key 10, 12 during the usual usage of the electronic device 4, 6 is sufficient. The coupling between the remote control 2 and the electronic device 4, 6 is therewith transparent for the user.

The processor can generate the coupling request 62 with a coupling code and/or an identification information of the communication interface 22 of the remote control 2. Alternatively or additionally, the processor 20 can generate the coupling request 62 with an instruction to the respective electronic device 4, 6, to wait for a radio signal 28 within the next time period.

Furthermore, a common transmission including coupling information of the control instruction 14 and the coupling request 62 should be understood in that the control instruction 14 and the coupling request 62 are subsequently transmitted one after another. Therein, it is not forcibly necessary that the control instruction 14 and the coupling request 62 are transmitted in a common IR-signal 26.

After the transmission of the coupling request 62, the processor 20 generates as next in a radio signal request step 64 a radio connection request 66 and controls the modulation circuit 24 in that the radio connection request 66 will be transmitted via the radio channel 28. Now, each electronic device 4, 6 in the vicinity can receive the radio connection request 66. However, only the electronic device 4, 6 that has received the coupling request 62 with the coupling code and the instruction to switch on the radio transceiver 40 in advance can interpret the radio connection request 66 and therewith react thereon. Because the user had directed the remote control 2 to a designated electronic device 4, 6 when transmitting the coupling request 62 with the IR-signals 26, it is automatically secured that the coupling request 62 arrives at the electronic device 4, 6 to be coupled without any necessity that the user has to intervene into the coupling process with programming measures, which might require background knowledge.

After the radio connection request 66, the processor 20 waits in a waiting decision step 68 for a reaction of the electronic device 4, 6 to which the radio connection request 66 was directed. After the waiting decision step 68, the processor 20 can either return to the radio signal request step 64 after a certain time lapse 70, or jump to the program end 74 after a predetermined amount 72 of failed attempts or store in a coupling finishing step 78 all necessary information enabling communicating with the now coupled electronic device 4, 6 over the radio channel 28, if a radio response 76 from the respective electronic device 4, 6 has been received, and than also jump to the program end 74.

Therewith, the coupling flow 54 is finished.

Alternatively to entering into the coupling flow 54, the processor 20 can decide at the coupled decision step 48 with a yes-decision 50 that the remote control 2 is already coupled with one of the electronic devices 4, 6. In this case, the processor 20 checks in a connected decision step 80, whether the remote control 2 is also connected with the electronic device 4, 6 with which it is coupled, to.

If this is not the case, that is the processor 20 quits the connected decision step 80 with a no-decision 52, the processor 20 will execute a connection establishing flow 82. Therein, the processor 20 checks at first in a stand-by checking step 84, whether the control instruction 14 from the receiving step 46 had been entered via the stand-by key 10 or any other key 12. If the user presses any other key 12 and not the stand-by key 10, the processor 20 will execute the coupling flow 54.

Otherwise, if the user presses the stand-by key 10, the processor 20 will execute initially an infrared transmission step 56 and IR-display step 58 that is the same as in the coupling flow 54. Thereafter, the processor 20 generates in a wake-up step 86 a wake-up instruction based on which the electronic device 4, 6 to which the remote control 2 is coupled to, will activate its radio transceiver 40. Next, the processor 20 controls the modulation circuit 24 in that the wake up instruction will be transmitted to the coupled electronic device 4, 6.

With the transmission of the wake up instruction, the connection establishing flow 82 is finished.

Alternatively to entering the connection establishing flow 82 the processor 20 can decide in the connected decision step 80 with a yes-decision 50 to an already existing radio connection with the coupled electronic device 4, 6. In this case, the processor will execute a radio transmission flow 88. In the radio transmission flow 88 the processor 20 drives the modulation circuit 24 and transmits the control instruction 14 with a radio signal 28 to the electronic device 6 that is coupled and connected with the remote control 2. In a radio display step 92, the processor 20 shows to the user the transmission of the control instruction 14 in the radio signal 28 by the radio signal illuminant 36. Therewith, the connection establishing flow 82 is finished.

Hereinafter, practical scenario 5 for the method of FIG. 2 that is executed by the processor 20 will be explained based on FIGS. 3 to 6 in more detail. Therein, all steps of the method of FIG. 2 that are not executed in a certain scenario, are shown in a dashed manner in FIGS. 3 to 6.

Figure 3:
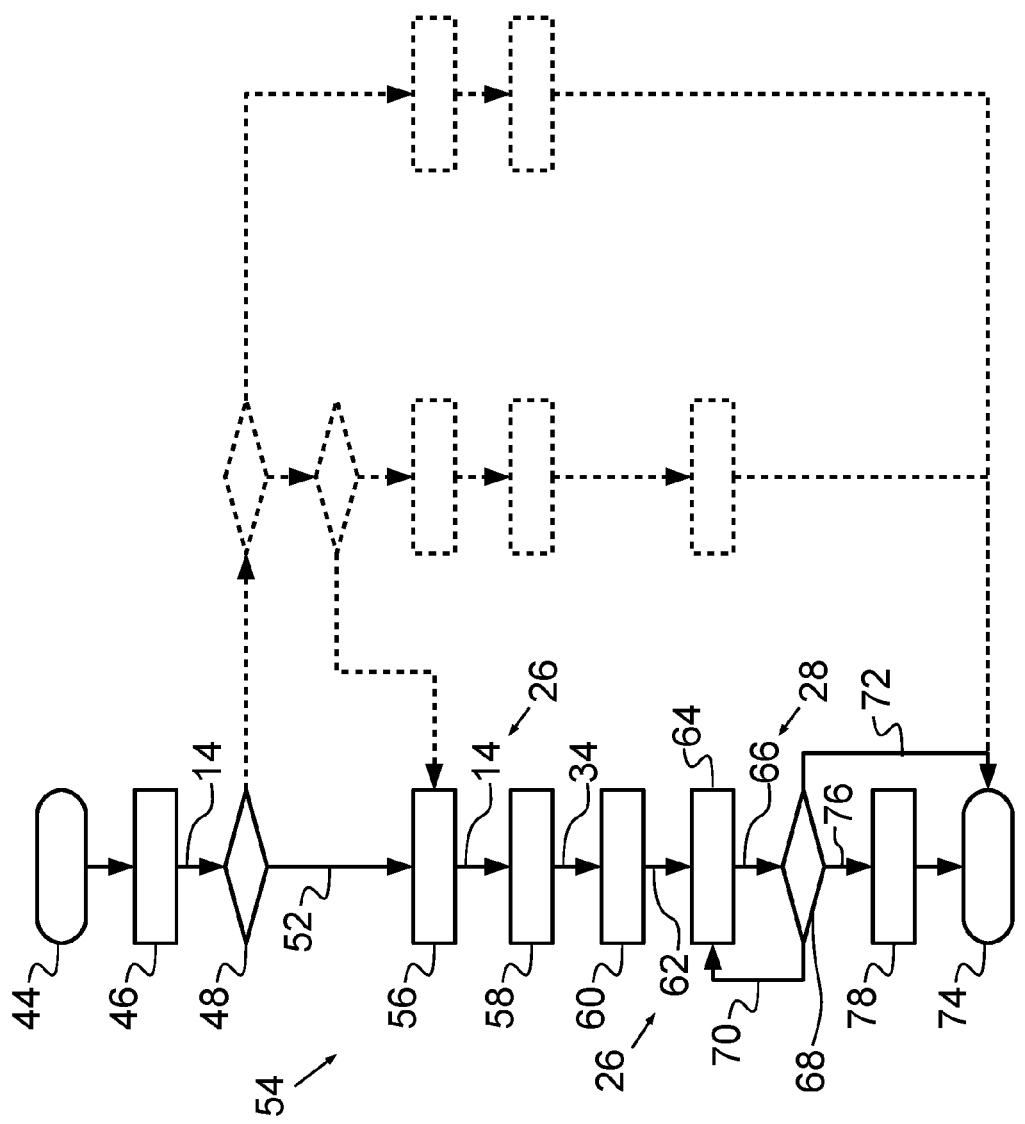
FIG. 3 a flowchart of the method in FIG. 2 in a first scenario.

Basically for the scenario shown in FIG. 3 shall be assumed that the remote control 2 is not coupled with any of the electronic devices 4, 6 and should be coupled with the first electronic device 4 to which the remote control 2 is directed.

After the user has input a control instruction 14 with one of the keys 10,12, the control instruction 14 will be transmitted in the IR-signal 26 to the first electronic device 4. Together with the control instruction 14 will then be transmitted the coupling request 62 in the IR-signal 26 and the remote control 2 be coupled with the first electronic device 4.

Figure 4:
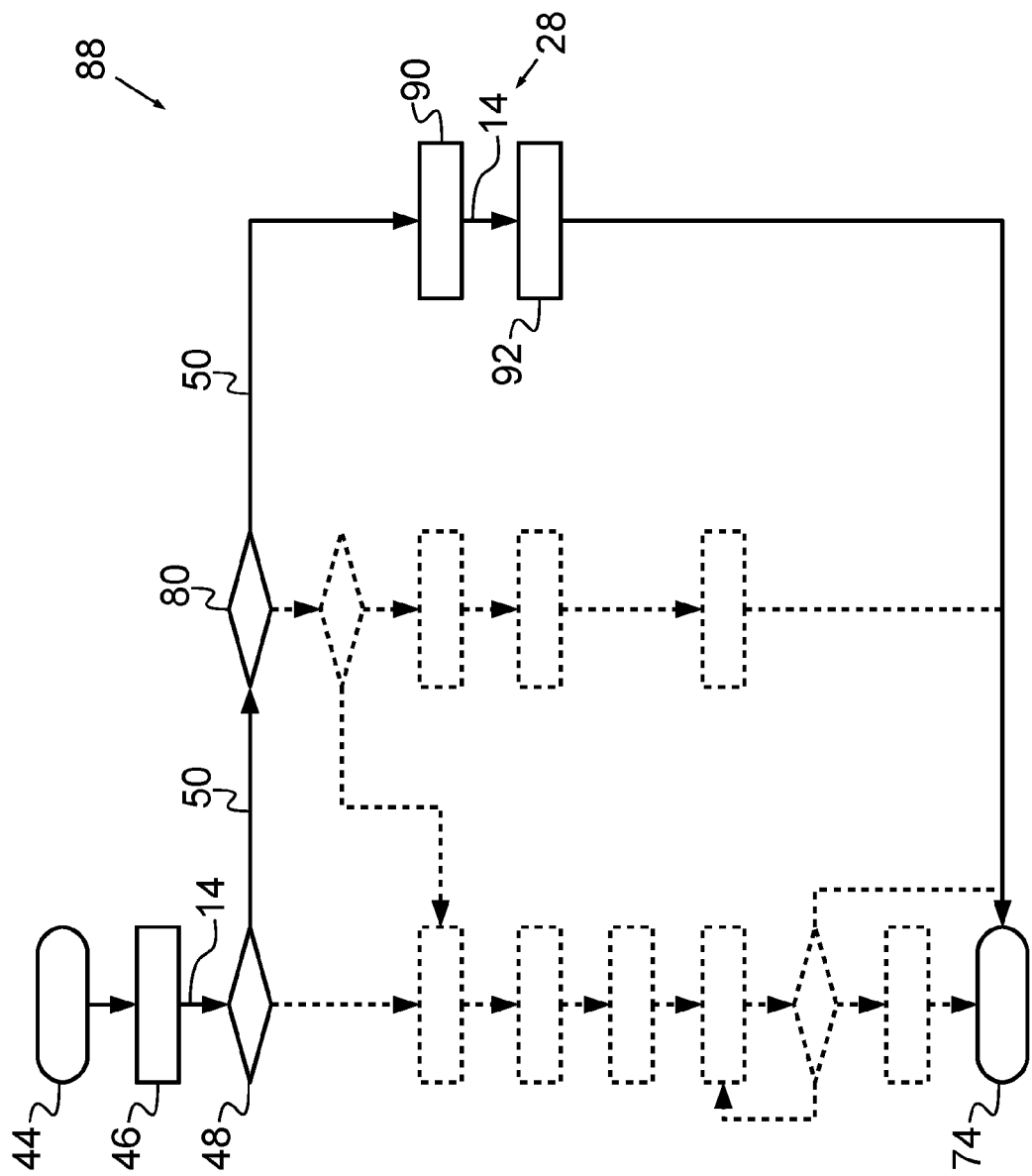
FIG. 4 a flowchart of the method in FIG. 2 in a second scenario.

Therewith, the user has switched on the first electronic device 4 wherein the coupling is executed in the background. Should the coupling immediately after switching on the first electronic device 4 be impossible, then the coupling will be done when sending one of the next control instructions 14, e.g. when changing a program. In the scenario of FIG. 4 should be assumed that the remote control 2 is coupled and connected with the first electronic device 4.

After the user had input the control instruction 14, the processor 20 of the remote control 2 decides in the decision steps 48, 80 that the remote control 2 is coupled and connected with the first electronic device 4. Than the control instruction 14 will be transmitted in the radio transmission flow 88 with the radio signal 28 to the first electronic device 4.

The selection of the radio signal 28 to transmit the control instruction 14 will be performed automatically by the processor 20 without any input that must be performed by the user.

Figure 5:
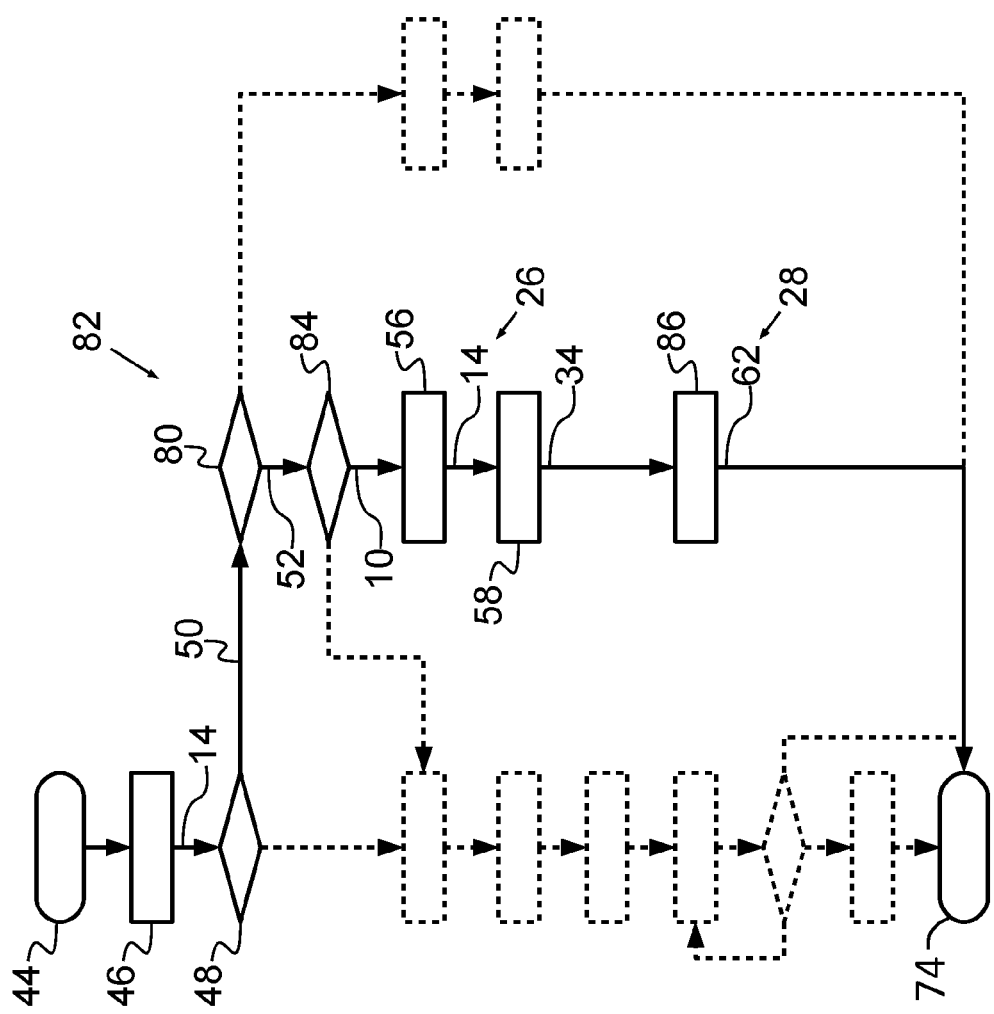
FIG. 5 a flowchart of the method in FIG. 2 in a third scenario.

In the scenario of FIG. 5, it should be assumed that the remote control 2 is coupled with the first electronic device 4, but however not connected therewith.

Such a case can happen, when the first electronic device 4 is in a sleeping mode. This thought will be used in the stand-by checking step 84 to differ between a wake-up instruction for the first electronic device 4 from the user and a new coupling with the first electronic device 4 that is intended by the user, when for example the remote control 2 is already connected with the second electronic device 6. This alternative scenario will be described later based on FIG. 6.

Is the first electronic device 4 in a stand-by mode and should be woken up, than the user presses the stand-by key 10. The processor 20 detects the pressed stand-by key 10 in the stand-by checking step 84 and wakes up the first electronic device 4 via the IR-signal 26 and its radio transceiver 40 via the wake-up instructions.

Also in this scenario the user controls simply the function of the first electronic device 4. To wake-up the radio transceiver 40, the user needs not to actively intervene.

Figure 6:
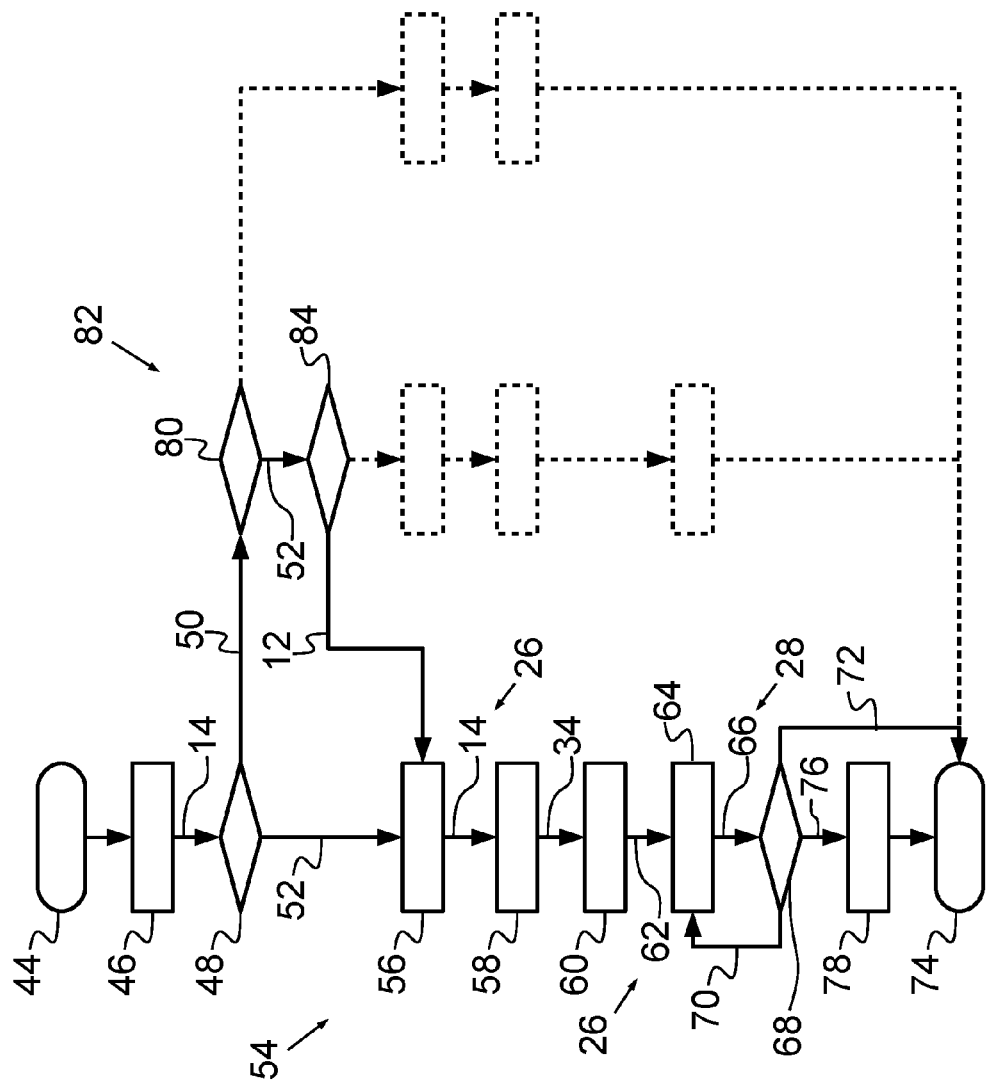
FIG. 6 a flowchart of the method in FIG. 2 in a fourth scenario.

Finally, the before mentioned alternative should be described based on a combined view of FIGS. 5 and 6. For this purpose it should be assumed that the remote control 2 is coupled and connected with the second electronic device 6, wherein the user however intents to couple the first electronic device 4 with the remote control 2. At this point, the only requirement that must be imposed to the user to recouple from the second electronic device 6 to the first electronic device 4 is, that the second electronic device 6 is in a stand-by mode such that the connected decision step 80 results into a no-decision 52 leading to the stand-by decision step 84.

If the user directs the remote control 2 that is coupled with the second electronic device 6 to the first electronic device 4 (that is exemplary located in another room) and switches it on by pressing the stand-by key 10, then the processor 20 executes at first the method flow shown in FIG. 5. In this case, the transmission of the stand-by control instruction 14 in the infrared transmission step 56 will wake up the first electronic device 4. However the wake-up instruction in the wake-up step 86 will keep ineffective, because the first electronic device 4 is not coupled with the remote control 2 in this scenario and can thus not receive any radio signal 28 from the remote control 2.

However, as soon as the user presses another key 12 than the stand-by key 10, the processor 20 returns in this scenario back to the stand-by decision step 84. In this case, the processor 20 will continue the method with the coupling flow 54 and couple the first electronic device 4 with the remote control 2.

That is, there is only one requirement to the user for using for the transparent coupling. He has to transfer the already coupled electronic device 6 into a sleeping mode when discoupling the already coupled electronic device 6 from the remote control 2 and recouple it to another electronic device 4. Further interactive inputs by the user are not required. Also in the fourth scenario according to FIG. 6 in combination with FIG. 5, the coupling is executed transparently to the user in the background.

For enabling the user to see whether he has to direct the remote control 2 to the electronic device 4 to be coupled or not, the IR-illuminant 34 and the radio illuminant 36 are provided. As long as the IR-illuminant 34 illuminates during pressing one of the keys 10, 12, the user must direct the remote control 2 to the electronic device 4, 6 during the operation of the respective electronic device 4, 6.

The invention claimed is:

1. Method to dispatch a request for coupling an electronic device and a remote control with an input interface to input a control instruction for controlling the electronic device on a radio channel, wherein the remote control is adapted to control the electronic device via the radio channel or an infrared channel, the method comprising:
   receiving the control instruction from the input interface of the remote control;
   appending the request for coupling to the received control instruction; and
   transmitting the control instruction together with the request for coupling via the infrared channel.

2. The method according to claim 1, wherein:
   when the remote control is not connected with the electronic device via the radio channel, the control instruction is transmitted together with the request for coupling via the infrared channel; and
   when the remote control is connected with the electronic device via the radio channel, the control instruction is dispatched via the radio channel alone.

3. The method according to claim 2 comprising:
   outputting an information on the remote control dependent from whether the control instruction is transmitted via the infrared channel or the radio channel.

4. The method according to claim 1 wherein the request for coupling is dependent on the control instruction.

5. The method according to claim 2 wherein the request for coupling is dependent on the control instruction.

6. The method according to claim 3 wherein the request for coupling is dependent on the control instruction.

7. The method according to claim 4:
   wherein the control instruction is a switch-on instruction for the electronic device and the request for coupling that is dependent on the control instruction is a wake-up instruction for the electronic device.

8. The method according to claim 4 wherein the request for coupling that is dependent on the control instruction includes an identification information that uniquely characterizes the remote control on the radio channel.

9. The method according to claim 8 wherein the identification information comprises a time information indicating when the remote control is active on the radio channel and/or a logical information used to identify the remote control on the radio channel.

10. A control apparatus comprising:
    a processor; and
    a memory containing a computer program that, when executed on the processor, performs a method to dispatch a request for coupling an electronic device and a remote control with an input interface to input a control instruction for controlling the electronic device on a radio channel, wherein the remote control is adapted to control the electronic device via the radio channel or an infrared channel, the method comprising:
    receiving the control instruction from the input interface of the remote control,
    appending the request for coupling to the received control instruction, and
    transmitting the control instruction together with the request for coupling via the infrared channel.

11. The control apparatus of claim 10, wherein:
    when the remote control is not connected with the electronic device via the radio channel, the control instruction is transmitted together with the request for coupling via the infrared channel; and
    when the remote control is connected with the electronic device via the radio channel, the control instruction is dispatched via the radio channel alone.

12. The control apparatus of claim 11, wherein the method includes outputting an information on the remote control dependent from whether the control instruction is transmitted via the infrared channel or the radio channel.

13. The control apparatus of claim 10, wherein the request for coupling is dependent on the control instruction and includes an identification information that uniquely characterizes the remote control on the radio channel.

14. A non-transitory computer-readable medium for dispatching a request for coupling an electronic device and a remote control with an input interface to input a control instruction for controlling the electronic device on a radio channel, wherein the remote control is adapted to control the electronic device via the radio channel or an infrared channel, comprising instructions stored thereon that, when executed on a processor, perform the steps of:
    receiving the control instruction from the input interface of the remote control; and
    transmitting the control instruction together with the request for coupling via the infrared channel.

15. The computer-readable medium of claim 14, wherein:
    when the remote control is not connected with the electronic device via the radio channel, the control instruction is transmitted together with the request for coupling via the infrared channel; and
    when the remote control is connected with the electronic device via the radio channel, the control instruction is dispatched via the radio channel alone.

16. The computer-readable medium according to claim 14 wherein:
    the steps comprise outputting an information on the remote control dependent from whether the control instruction is transmitted via the infrared channel or the radio channel.

17. The computer-readable medium of claim 15 wherein the request for coupling is dependent on the control instruction.

18. The computer-readable medium of claim 15 wherein the control instruction is a switch-on instruction for the electronic device and the request for coupling that is dependent on the control instruction is a wake-up instruction for the electronic device.

19. The computer-readable medium of claim 15 wherein the request for coupling that is dependent on the control instruction includes an identification information that uniquely characterizes the remote control on the radio channel.

20. The computer-readable medium of claim 19 wherein the identification information comprises a time information indicating when the remote control is active on the radio channel and/or a logical information used to identify the remote control on the radio channel.

\* \* \* \* \*